(12) United States Patent
Murillo et al.

(10) Patent No.: US 9,715,619 B2
(45) Date of Patent: Jul. 25, 2017

(54) FACILITATING ALIGNING A USER AND CAMERA FOR USER AUTHENTICATION

(71) Applicant: Microsoft Technology Licensing, LLC, Redmond, WA (US)

(72) Inventors: Oscar Enrique Murillo, Redmond, WA (US); William Hunter Jennings, Seattle, WA (US); Stephen C. Speicher, Redmond, WA (US); Craig A. Fox, Bellevue, WA (US); Matthew Anson Hartman, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/658,172

(22) Filed: Mar. 14, 2015

(65) Prior Publication Data
US 2016/0267319 A1 Sep. 15, 2016

(51) Int. Cl.
*G06K 9/00* (2006.01)
*G06K 9/22* (2006.01)

(52) U.S. Cl.
CPC ..... *G06K 9/00255* (2013.01); *G06K 9/00604* (2013.01); *G06K 9/00912* (2013.01); *G06K 9/228* (2013.01)

(58) Field of Classification Search
USPC .................................................. 382/115–118
See application file for complete search history.

(56) References Cited

U.S. PATENT DOCUMENTS

| 5,534,917 | A | 7/1996 | MacDougall |
| 6,685,366 | B1 | 2/2004 | Corbin |
| 6,760,467 | B1 * | 7/2004 | Min .................. G06K 9/00899 351/209 |
| 7,091,928 | B2 | 8/2006 | Rajasingham |
| 8,370,639 | B2 | 2/2013 | Azar et al. |
| 8,499,257 | B2 | 7/2013 | Mattingly et al. |
| 8,667,519 | B2 | 3/2014 | Small et al. |
| 8,700,258 | B2 | 4/2014 | Tate, Jr. et al. |
| 8,739,672 | B1 | 6/2014 | Kelly |
| 8,749,557 | B2 | 6/2014 | Evertt et al. |
| 8,891,827 | B2 | 11/2014 | Lee et al. |

(Continued)

OTHER PUBLICATIONS

"Skeletal Tracking", Retrieved From: <http://msdn.microsoft.com/en-us/library/hh973074.aspx> Jul. 17, 2014, Nov. 2, 2012, 4 pages.

(Continued)

*Primary Examiner* — Alex Liew

(57) ABSTRACT

A user is authenticated based on user features that can be captured by a camera, such as facial features or eye features. In order for the user to be authenticated, an image is captured of the user while the user is within an interaction zone, which is an area that is within both a field of view of the camera and a suitable distance range from the camera. If the user is not within the suitable distance range from the camera, then feedback is provided indicating that the user is not within the suitable distance range from the camera. Various feedback can be provided, such as one or a combination of audio, visual, and haptic feedback. The feedback notifies the user that an adjustment is to be made to the location of the user and/or the camera in order for the user to be within the interaction zone.

20 Claims, 6 Drawing Sheets

(56) References Cited

U.S. PATENT DOCUMENTS

| | | | |
|---|---|---|---|
| 2009/0161963 A1 | 6/2009 | Uusitalo et al. | |
| 2010/0027854 A1* | 2/2010 | Chatterjee | G06F 3/016 |
| | | | 382/124 |
| 2010/0189313 A1* | 7/2010 | Prokoski | A61B 5/0064 |
| | | | 382/118 |
| 2010/0277411 A1 | 11/2010 | Yee et al. | |
| 2011/0157009 A1 | 6/2011 | Kim et al. | |
| 2011/0216209 A1 | 9/2011 | Fredlund et al. | |
| 2011/0317872 A1* | 12/2011 | Free | G06K 9/00228 |
| | | | 382/103 |
| 2014/0253427 A1 | 9/2014 | Gruhlke et al. | |

OTHER PUBLICATIONS

Fincher,"Sony patents temperature feedback games controller", Retrieved at: http://www.gizmag.com/sony-controller-temperature-feedback/24599/, Oct. 17, 2012, 3 pages.

Jozuka,"Invisible 3D Objects can be felt thanks to haptic holograms", Science—Bristol Interaction Graphics_University of Bristol, Retrieved from: http://www.wired.co.uk/news/archive/2014-12/08/3d-objects-in-mid-air-through-ultrasound, Dec. 8, 2014, 2 pages.

Kendrick,"Tasting the Light: Device Lets the Blind "See" with Their Tongues", Retrieved at: http://www.scientificamerican.com/article/device-lets-blind-see-with-tongues/?print=true, Aug. 13, 2009, 3 pages.

Lamkin,"Microsoft bone conduction headset makes cities more accessible for the blind", Trials between tech giant and charity Guide Dogs underway—Retrieved at: http://www.wareable.com/wearable-tech/microsoft-bone-conduction-headset-for-the-blind-448, Nov. 6, 2014, 2 pages.

Makris,"Are Object Affordances Fully Automatic? A Case of Covert Attention", In Proceedings of Behavioral Neuroscience, vol. 127, No. 5, Oct. 2013, 6 pages.

\* cited by examiner

FACILITATING ALIGNING A USER AND CAMERA FOR USER AUTHENTICATION

BACKGROUND

As computing technology has advanced, computers have become increasingly commonplace. Given the large amounts of data that can be stored on computers, and the access to various resources or functionality that computers provide, users oftentimes desire to lock their computers so that they cannot be used by others. The process of unlocking a computer, however, can be cumbersome and tedious for the user, especially if he or she accesses the computer many times throughout the day.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an image of a user captured by a camera is obtained. Whether the user is within an interaction zone is determined, the interaction zone comprising an area bounded by both a field of view of the camera and a distance range suitable for identifying features of the user from an additional image of the user captured by the camera. Feedback is provided indicating whether the user is within the interaction zone, the feedback comprising one or a combination of audio feedback, visual feedback, and haptic feedback.

In accordance with one or more aspects, a device includes a camera and one or more feedback components. The camera is configured to capture one or more images of a user. The one or more feedback components are configured to receive an indication of whether the user is within a suitable distance range for identifying features of the user from at least one of the one or more images of the user, and to provide feedback indicating whether the user is within the suitable distance range. The one or more feedback components are also configured to provide one or a combination of audio feedback, visual feedback, and haptic feedback.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
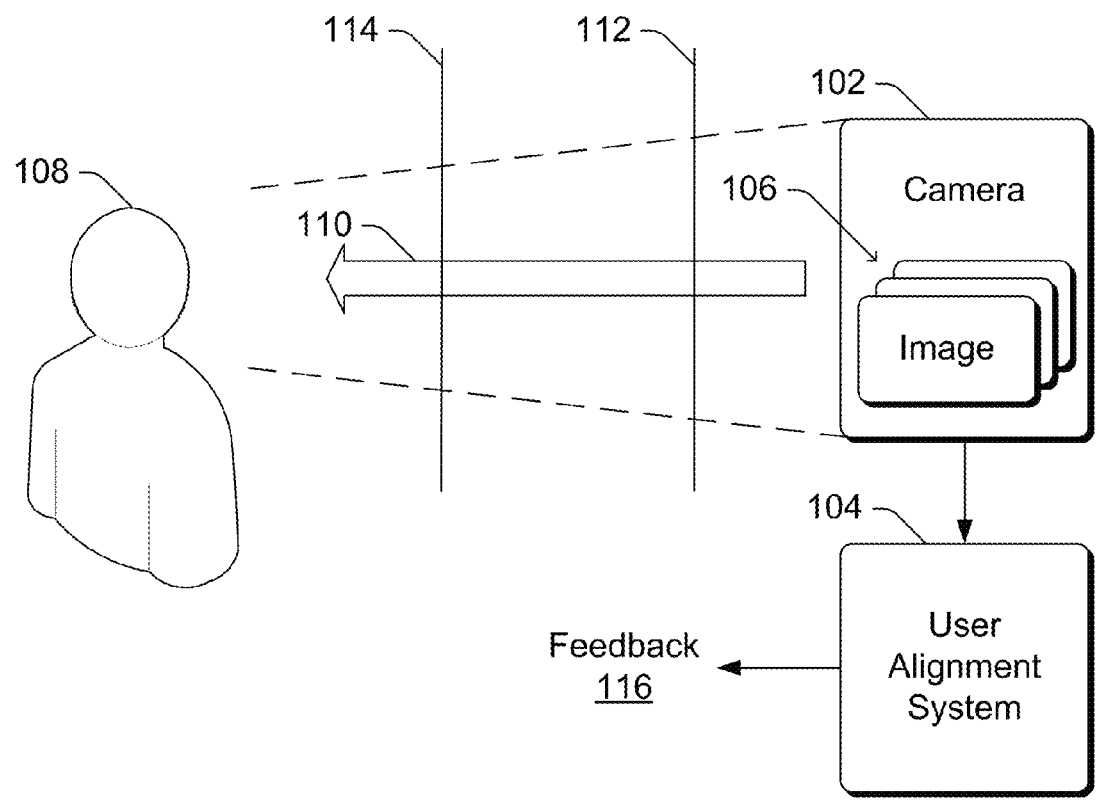
FIG. 1 illustrates an example system implementing the facilitating aligning a user and camera for user authentication in accordance with one or more embodiments.

Facilitating aligning a user and camera for user authentication is discussed herein. A camera captures one or more images of a user, and those images are made available to an authentication module of a device in order for the device to authenticate the user. The user is authenticated based on features of the user that can be captured by the camera, such as facial features, eye or iris features, and so forth, allowing the user to quickly unlock or otherwise access the device without entry of password, personal identification number, and so forth. To authenticate a user, an image is captured of the user while the user is within an interaction zone. The interaction zone refers to an area that is within a field of view of the camera as well as within a suitable distance range from the camera so that the features can be identified from the captured image.

To facilitate having the user situated so that he or she is within the interaction zone, prior to authenticating the user, a determination is made as to whether the user is within the suitable distance range from the camera. If the user is within the suitable distance range from the camera, then a new image can be captured and used for authentication, or an image previously captured while determining whether the user is within the suitable distance range can be used for authentication. If the user is not within the suitable distance range from the camera, then feedback is provided to the user indicating that the user is not within the suitable distance range from the camera. The suitable distance range can vary based on the type of features detected, such as approximately 22 centimeters (cm)-28 cm if eye or iris features are being detected, and approximately 30-100 cm if facial features are being detected. Facial features may be determined by measurements of facial width and height, or facial characteristics, such as measurements of, for example, face width and height, distance from the forehead hairline to a spot between the eyes, distance from between the eyes to the bottom of the nose, and distance from the bottom of the nose to the bottom of the chin. Various feedback can be provided, such as one or a combination of audio feedback, visual feedback, and haptic feedback. The feedback notifies the user that an adjustment is to be made to the location of the user and/or the camera in order for the user to be within the interaction zone. Additional images are captured and the process is repeated until an image is captured of the user in the interaction zone.

The techniques discussed herein provide quick feedback to a user as to whether or not the user is within the suitable distance range from the camera, allowing the user to more quickly position himself or herself (and/or the camera) so that the user is within the suitable distance range from the camera. Because the user is positioned within the suitable distance range from the camera more quickly, an image that can be used for authentication is captured more quickly. This reduces usage of the camera to capture images of the user for authentication, and thus reduces energy usage and improves battery life for the device including the camera. Furthermore, because the user is positioned within the suitable distance range from the camera more quickly, an image that can be used for authentication is captured more quickly. This reduces the number of images that are analyzed by an authentication module, and thus reduces the load on a processor implementing the authentication module.

FIG. 1 illustrates an example system 100 implementing the facilitating aligning a user and camera for user authentication in accordance with one or more implementations. System 100 includes a camera 102 and a user alignment system 104. The camera 102 can be any of a variety of different types of image capture devices capturing images in the visible light spectrum, infrared (IR) spectrum, and so forth. The camera 102 can be a single-sensor camera or a stereoscopic camera, and can use various digital imaging technologies (e.g., charge-coupled devices (CCDs), complementary metal-oxide-semiconductor (CMOS) sensors, and so forth). The camera 102 and the user alignment system 104 are each implemented by one or more devices. A variety of different types of devices can be used to implement the camera 102 and the live face detection module 104, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch, bracelet, head-mounted display), an entertainment device (e.g., an entertainment appliance, a set-top box communicatively coupled to a display device, a game console), a television or other display device, an automotive computer, an Internet of Things (IoT) device, and so forth.

In one or more implementations, the camera 102 and the user alignment system 104 are implemented as part of the same device, such as part of a mobile device. Alternatively, the camera 102 and the user alignment system 104 are implemented as separate devices. For example, the camera 102 can be implemented as part of a wearable device and the user alignment system 104 can be implemented as part of mobile device, the camera 102 can be implemented as a standalone camera and the user alignment system 104 can be implemented as part of a desktop device, and so forth. When implemented as separate devices, the devices implementing the camera 102 and the user alignment system 104 can communicate with one another via a wired or wireless connection, such as a USB (universal serial bus) connection, a wireless USB connection, an infrared connection, a Bluetooth connection, a DisplayPort connection, a PCI (a peripheral component interconnect) Express connection, and so forth. The camera 102 and the user alignment system 104 can alternatively or additionally be connected to one another via a data network, such as a personal area network.

System 100 is part of, or in communication with, an authentication module. Such an authentication module can be used to restrict access to a particular device, resource, location, and so forth. For example, system 100 can be used with an authentication module that restricts which users can access (e.g., log into or unlock) a particular device, which users can access (e.g., enter) a particular building, which users can access (e.g., log into) a particular network, which users can access functionality of a particular device (e.g., a heating and cooling system), and so forth. Such an authentication module can also restrict access to a particular service, such as a remote service (e.g., a Web site accessed via the Internet), a local payment terminal (e.g., at a brick and mortar store to authorize payment from an electronic wallet or other payment source). For example, a child using a computing device may send a request to a parent to buy an application or other item, and the authentication module authenticates the parent in obtaining the parent's approval for the purchase. By way of another example, the child may hand his or her computing device to the parent, and an authentication module on the computing device authenticates the parent in obtaining the parent's approval for the purchase. System 100 facilitates aligning the user and the camera so that an image of the user that can be quickly captured and used to determine whether such access can be allowed, as discussed in more detail below.

The camera 102 captures multiple images 106 each including at least part of the head of a user 108, and makes images 106 available to the user alignment system 104. The images 106 include various features of the user. A feature of the user refers to a characteristic of the user that can be used to differentiate users from one another. For example, features can be the size of eyes or nose, a pattern of veins, scars or other marks on skin, measurements of various facial features, and so forth. Various different features of the user can be analyzed by an authentication module to authenticate the user 108, such as features of the user's face, features of the user's eye, features of the user's iris, and so forth.

In order to identify the features of the user 108, the user is aligned within an interaction zone (also referred to as an interaction area, engagement zone, or engagement area). The interaction zone is bounded by both a field of view of the camera 102 and a suitable distance range for identifying features of the user. The field of view of the camera 102 is the range (e.g., a particular angle or number of degrees) for which the camera 102 can capture signals (e.g., visible or infrared light). The field of view can vary for different cameras. The suitable distance range varies based on one or a combination of the features being identified, the camera 102, and the authentication module that is authenticating the user 108. In order for the user 108 to be within the interaction zone 108, the user 108 needs to be within the suitable distance range for identifying features of the user 108. This is illustrated in the system 100 by an arrow 110 indicating a direction away from the camera 102 that the user 108 is situated. The suitable distance range for identifying features of the user is a set of distances that satisfy a lower threshold distance away from the camera 102 (e.g., at least the lower threshold distance away from the camera 102, or greater than the lower threshold distance away from the camera 102), and that satisfy an upper threshold distance away from the camera 102 (e.g., no greater than the upper threshold distance away from the camera 102, or less than the upper threshold distance away from the camera 102).

An example lower threshold distance is illustrated in system 100 as line 112, and an example upper threshold distance is illustrated in system 100 as line 114. The user is situated within the suitable distance range for identifying features of the user if the distance the user is away from the camera 102 satisfies both the lower threshold distance and the upper threshold distance. If the user is situated a distance away from the camera that does not satisfy both the lower threshold distance and the upper threshold distance, then the user is not within the suitable distance range for identifying features of the user.

The user alignment system 104 determines, based on one or more of the images 106, whether the user 108 is within the suitable distance range for identifying features of the user. The user alignment system 104 provides feedback 116 indicating whether the user is within the suitable distance range for identifying features of the user. The feedback 116 can be foveal (in the primary focal area of the vision of the user 108) or non-foveal (in the peripheral vision of the user 108). In situations in which the user is not within the suitable distance range for identifying features of the user, the feedback 116 provides an indication to the user 108 that he or she is not within the suitable distance range for identifying features of the user. The feedback 116 can also optionally provide an indication to the user 108 whether he or she is too close to the camera 102 (e.g., the lower threshold distance is not satisfied) or too far away from the camera 102 (e.g., the upper threshold distance is not satisfied). The feedback 116 can take various forms, such as one or a combination of audio feedback, visual feedback, and haptic feedback as discussed in more detail below.

Figure 2:
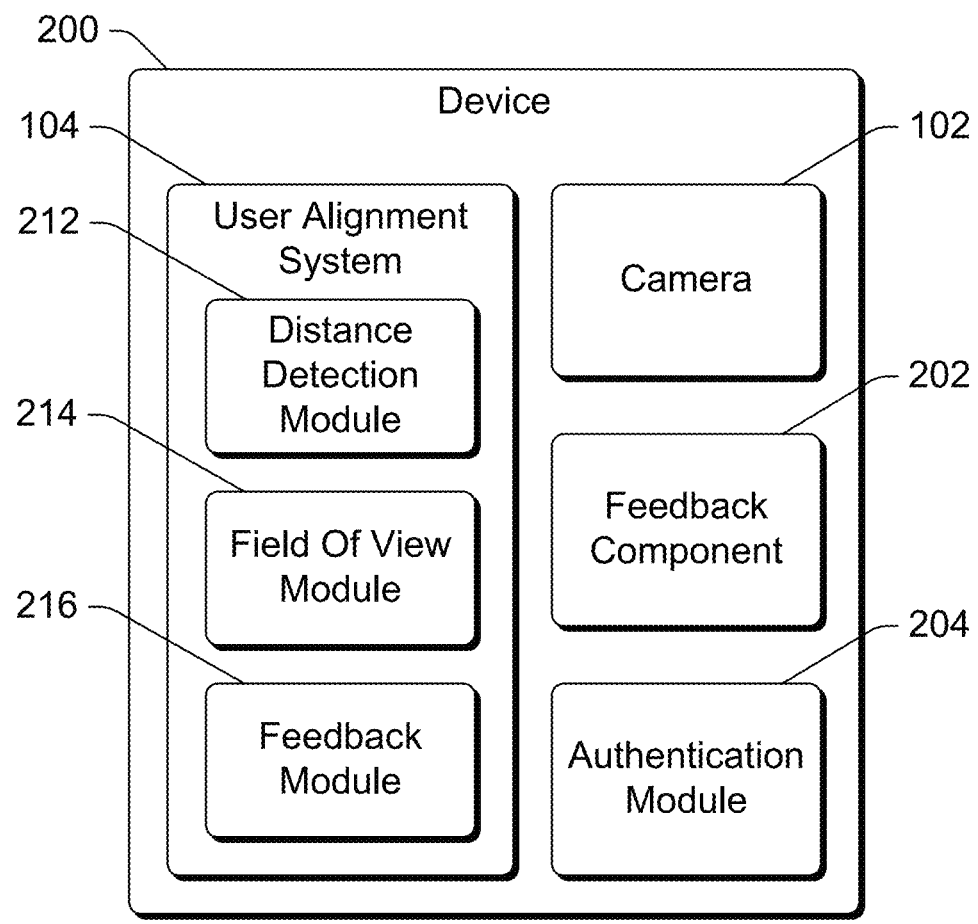
FIG. 2 illustrates an example device implementing the aligning a user and camera for user authentication in accordance with one or more implementations.

FIG. 2 illustrates an example device 200 implementing the aligning a user and camera for user authentication in accordance with one or more implementations. The device 200 can be any of a variety of different types of devices, such as any of the types of devices discussed above as implementing the camera 102 and/or the live face detection module 104 of FIG. 1. The device 200 includes the camera 102 and the user alignment system 104 discussed above, as well as a feedback component 202 and an authentication module 204.

The authentication module 204 analyzes one or more images captured by the camera 102 while the user is within the interaction zone. The authentication module 204 analyzes various features of the user captured in the one or more images, and compares those features to known features of the user to determine whether to authenticate the user. The authentication module 204 can use various public and/or proprietary recognition techniques to determine whether the features of the user in the captured images match (are the same as) the known features of a user. Such techniques can be, for example face recognition techniques, eye recognition techniques, iris recognition techniques, skin complexion and/or skin pattern recognition techniques, ear recognition techniques, bone structure recognition techniques, and so forth.

The authentication module 204 authenticates the user, and allows the user access to the device 200 (e.g., unlocks the device 200), or access to other resources, locations, or services as discussed above. After the user is authenticated (or alternatively after one or more images of the user while the user is within the interaction zone), the camera 102 can be powered down or deactivated, as images form the camera 102 are no longer needed to authenticate the user. The authentication of the user based on features of the user in the captured images can be the sole authentication of the user, or alternatively can be one step in a multi-step authentication process. For example, in order to access a desired device, resource, location, or service, the user may also have to satisfy other authentication requests by the authentication module 204 or a different authentication module or system (e.g., entry of an alphanumeric code sent to a user's smartphone, entry of a password, and so forth).

The user alignment system 104 includes a distance detection module 212, a field of view module 214, and a feedback module 216. The distance detection module 212 determines the distance that the user is from the camera 102. In one or more implementations, the distance detection module 212 analyzes images captured by the camera 102 and uses any of a variety of public and/or proprietary techniques to determine the distance that the user is from the camera 102. Alternatively, the distance detection module 212 can analyze signals available from other sensors or input components of the device 200 to determine the distance that the user is from the camera 102 using any of a variety of public and/or proprietary techniques, such as signals received from audio sensors, motion sensors, and so forth.

The field of view module 214 detects whether the user is within the field of view of the camera 102. In one or more implementations, the field of view module 214 analyzes images captured by the camera 102 and uses any of a variety of public and/or proprietary techniques to determine whether the user is within the field of view of the camera 212. Alternatively, the field of view module 214 can analyze signals available from other sensors or input components of the device 200 to determine whether the user is within the field of view of the camera 212 using any of a variety of public and/or proprietary techniques, such as signals received from audio sensors, motion sensors, and so forth.

In one or more implementations, the field of view module 214 is optional. In implementations in which the field of view module 214 is not included, the user alignment system 104 assumes that the user knows to be within the field of view of the camera 102. For example, the user alignment system 104 can assume that the user knows to look at the camera 102 (or otherwise point the camera 102 towards the user features being analyzed for authentication) in order to be authenticated.

The feedback module 216 determines whether the user is within the interaction zone, and what, if any, feedback is to be provided to the user. The interaction zone, as discussed above, is bounded by both a field of view of the camera 102 and a suitable distance range for identifying features of the user. The field of view and the suitable distance range can vary. For example, the field of view and suitable distance range for face recognition can be a 60 degree field of view and a suitable distance range of 30-100 cm. By way of another example, the field of view and suitable distance range for eye or iris recognition can be a 30 degree field of view and a suitable distance range of 22-28 cm. The feedback module 216 is configured with or otherwise has access to the field of view and suitable distance range for the authentication performed by the authentication module 204.

In one or more implementations, the authentication module 204 uses multiple different user features concurrently for authentication, such as performing both face recognition and iris recognition concurrently. The feedback module 216 is configured with or otherwise has access to the field of view and the suitable distance range for both of these types of recognition. For example, the overlap in field of view and the suitable distance range for the different types of recognition can be used as the bounds of the interaction zone. For example, if the field of view and suitable distance range for face recognition is a 60 degree field of view and a suitable distance range of 30-100 cm, and the field of view and suitable distance range for iris recognition is a 30 degree field of view and a suitable distance range of 22-28 cm, then the interaction zone for performing both face recognition and iris recognition is bounded by a 30 degree field of view and a suitable distance range of 22-28 cm.

The distance detection module 212 provides to the feedback module 216 an indication of the distance that the user is away from the camera 102. The field of view module 214 optionally provides to the feedback module 216 an indication of whether the user is within the field of view of the camera. Alternatively, the field of view module 214 need provide no such indication. For example, the feedback module 216 can assume that if the distance detection module 212 detects a distance that the user is away from the camera 102, that the user is within the field of view of the camera 102.

The feedback module 216 decides, based at least in part on the distance that the user is away from the camera 102, what feedback is to be provided to the user. The feedback module 216 provides an indication to the feedback component 202 of the feedback that is to be provided, and the feedback component 202 provides the feedback. Although a single feedback component 202 is illustrated in FIG. 2, it should be noted that the device 200 can include multiple feedback components. The feedback provided by the feedback component 202 is designed to provide to the user an indication of whether he or she is within the suitable distance range of the camera 102. The feedback can also be designed to provide to the user, if the user is not within the suitable distance range of the camera 102, an indication of whether the user is too far away from the camera 102 or too close to the camera 102. The feedback can also be designed to provide to the user, if the user is within the suitable distance range of the camera 102, an indication that the user is within the suitable distance range of the camera 102.

The feedback component 202 can be implemented as one or more of a variety of different components. In one or more implementations, the feedback component 202 is a display screen of the device 200. Additionally or alternatively, the feedback component 202 can be a speaker or other component that generates audible signals that can be heard by the user. Additionally or alternatively, the feedback component 202 can be a light emitting diode (LED) or other light source that generates light visible to the user. Additionally or alternatively, the feedback component 202 can be a haptic feedback component, such as a piezo actuator or other motor. Additionally or alternatively, the feedback component 202 can be any of a variety of components or objects that generate signals, sounds, smells, and so forth that can be sensed by the user.

The feedback provided by the feedback component 202 can take a variety of different forms. In one or more implementations, the feedback provided by the feedback component 202 is a blurring of an image on a display screen of the device 200 (e.g., a touchscreen of a mobile device). The displayed image can be a lock screen image or any of a variety of other images. If the user is within the suitable distance range, then the image is displayed as clear (non-blurred). If the user is not within the suitable distance range, then the image is displayed as blurred. The displayed image can be blurred by different amounts based on how far away from the suitable distance range the user is. The further the user is away from the suitable distance range, the greater the amount of blur in the displayed image. As the user (and/or device 200) is moved so that the user gets closer to the suitable distance range, the blur is reduced. Similarly, as the user (and/or device 200) is moved so that the user gets further from the suitable distance range, the blur is increased. Different amounts of blur can be applied by feedback module 216 using any of a variety of different public and/or proprietary image blurring techniques, or by the feedback module 216 selecting an appropriate one image (having an appropriate amount of blur) from a set of multiple images having different amounts of blur.

Figure 3:
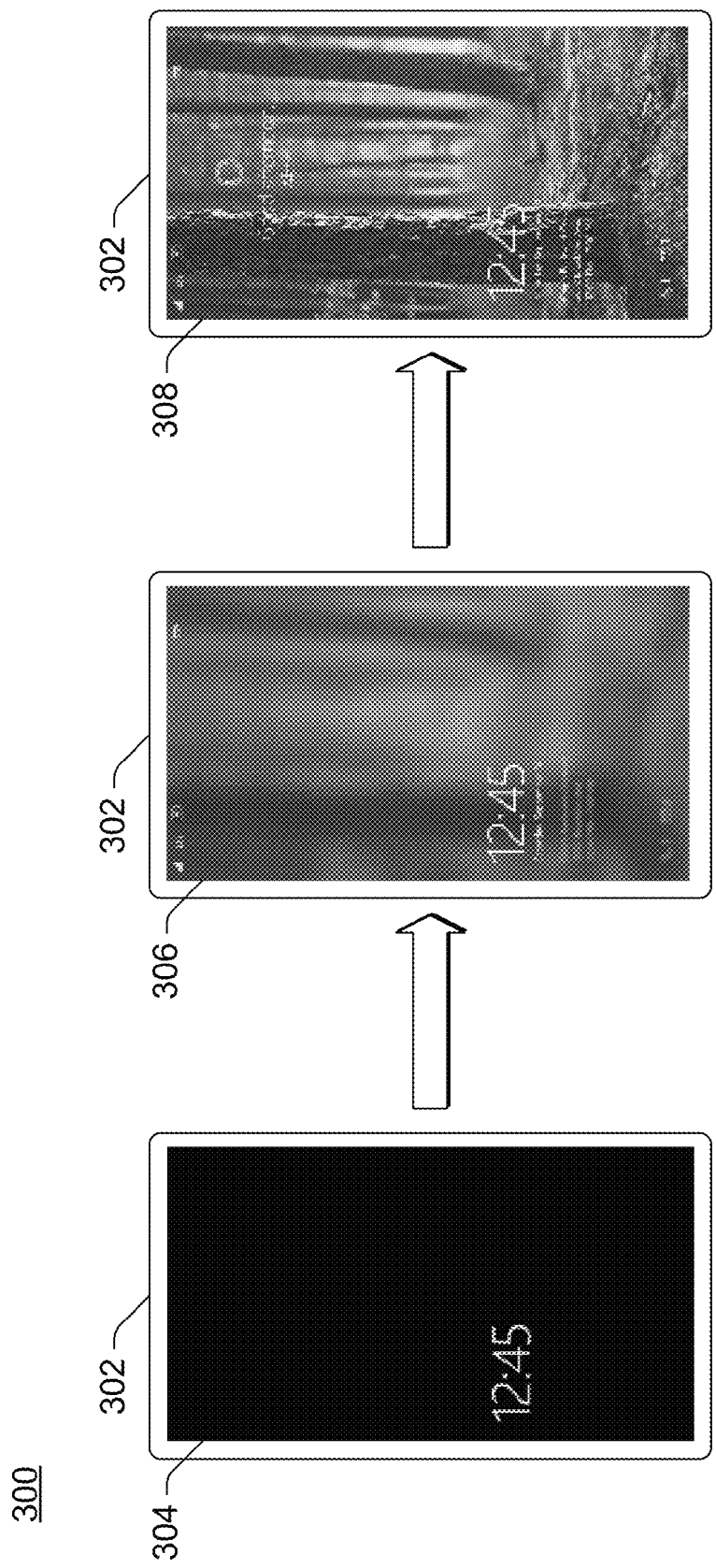
FIG. 3 illustrates an example of applying blur to an image as feedback in accordance with one or more implementations.

FIG. 3 illustrates an example 300 of applying blur to an image as feedback in accordance with one or more embodiments. As illustrated in the example 300, a display screen 302 can display various images. While no user is being authenticated, or no user is within the field of view of the camera, the display screen is blank, illustrated as image 304. In response to a user desiring to be authenticated, but not being within the suitable distance range, a lock screen image is displayed as blurred, illustrated as image 306. As the user (and/or device 200) is moved so that the user gets further from the suitable distance range, the blur is decreased, and when the user is within the suitable distance range the image is displayed as clear (not blurred), illustrated as image 308.

Returning to FIG. 2, the blurring can also be applied to a background displayed on the display screen of the device while another window or portion on the display screen is not blurred. For example, a dialog box may be displayed requesting that the user authenticate himself or herself. That dialog box can remain clear (not blurred), while a displayed background image is blurred by different amounts based on how far away from the suitable distance range the user is. Alternatively, the blurring can be applied to a particular window or portion on the display screen while a background and other windows or portions on the display screen of the device are not blurred. For example, a window displaying a user interface for a Web browser or other application may be displayed, and user authentication is needed to authorize payment to a remote or local service. The background and any other windows displayed on the display screen can remain clear (not blurred), while the window displaying the user interface for the Web browser or other application is blurred by different amounts based on how far away from the suitable distance range the user is.

In one or more implementations, the feedback provided by the feedback component 202 is a transitioning of an image on a display screen of the device 200 (e.g., a touchscreen of a mobile device) from a black and white image to a color image (or vice versa). The displayed image can be a lock screen image or any of a variety of other images. If the user is within the suitable distance range, then the image is displayed in full color (e.g., with a high saturation value). If the user is not within the suitable distance range, then the image is displayed as black and white or alternatively as less colorful. The colorfulness of the displayed image can vary based on how far away from the suitable distance range the user is. The further the user is away from the suitable distance range, the less the colorfulness. As the user (and/or device 200) is moved so that the user gets closer to the suitable distance range, the colorfulness is increased. Similarly, as the user (and/or device 200) is moved so that the user gets further from the suitable distance range, the colorfulness is decreased. The colorfulness can be changed by feedback module 216 using any of a variety of different public and/or proprietary coloring techniques (e.g., by changing the saturation of the image), or by the feedback module 216 selecting an appropriate one image (having an appropriate amount of colorfulness) from a set of multiple images having different amounts of colorfulness.

In one or more implementations, the feedback provided by the feedback component 202 is a transitioning of an image on a display screen of the device 200 (e.g., a touchscreen of a mobile device) from one image to another. The displayed image can be a lock screen image or any of a variety of other images. If the user is within the suitable distance range, then a first image is displayed. If the user is not within the suitable distance range, then a second image is displayed, or some combination of the first and second images are displayed concurrently (e.g., one image being partially transparent and displayed overlaid on top of the other image). The amount of transparency of an image can vary based on how far away from the suitable distance range the user is. The further the user is away from the suitable distance range, the less transparent the first image is (or the more transparent the second image is). As the user (and/or device 200) is moved so that the user gets closer to the suitable distance range, the transparency of the first image is increased (or the transparency of the second image is decreased). Similarly, as the user (and/or device 200) is moved so that the user gets further from the suitable distance range, the transparency of the first image is decreased (or the transparency of the second image is increased). The transparency can be changed by feedback module 216 using any of a variety of different public and/or proprietary techniques, or by the feedback module 216 selecting an appropriate one image that is a combination of the first and second images (having an appropriate amount of transparency of the first and/or second image) from a set of multiple images having different amounts of image transparency.

In one or more implementations, the feedback provided by the feedback component 202 is a transitioning from a blank screen to an image on a display screen of the device 200 (e.g., a touchscreen of a mobile device). The displayed image can be a lock screen image or any of a variety of other images. If the user is within the suitable distance range, then the image is displayed. If the user is not within the suitable distance range, then a blank screen is displayed or alternatively a partially filled image is displayed (e.g., only selected pixels of the image are displayed). The amount of pixels of the image that are displayed can vary based on how far away from the suitable distance range the user is. The further the user is away from the suitable distance range, the fewer pixels of the image are displayed. As the user (and/or device 200) is moved so that the user gets closer to the suitable distance range, the number of pixels displayed is increased. Similarly, as the user (and/or device 200) is moved so that the user gets further from the suitable distance range, the number of pixels displayed is increased. The number of pixels displayed can be changed by feedback module 216 using any of a variety of different public and/or proprietary techniques, or by the feedback module 216 selecting an appropriate one image (having an appropriate number of pixels of the image displayed) from a set of multiple images having different numbers of pixels displayed.

In one or more implementations, the feedback provided by the feedback component 202 is a change in luminous intensity of a light source (e.g., how bright the light source is to the user), such as an LED of the device 200, a portion (or all) of a display screen of the device 200, and so forth. If the user is within the suitable distance range, then the luminous intensity is high (e.g., a full or maximum luminous intensity of the light source). If the user is not within the suitable distance range, then the luminous intensity is lower. The luminous intensity can vary based on how far away from the suitable distance range the user is. The further the user is away from the suitable distance range, the lower the luminous intensity. As the user (and/or device 200) is moved so that the user gets closer to the suitable distance range, the luminous intensity of the light source is increased. Similarly, as the user (and/or device 200) is moved so that the user gets further from the suitable distance range, the luminous intensity of the light source is increased. The luminous intensity can be changed by feedback module 216 using any of a variety of different public and/or proprietary techniques.

In one or more implementations, the feedback provided by the feedback component 202 is changing of a bar or other icon to indicate progress towards being within the suitable distance range. The bar or other icon is displayed on a display screen of the device 200 (e.g., a touchscreen of a mobile device). If the user is within the suitable distance range, then the bar is displayed with an indication of such (e.g. the bar is completely filled in, or an arrow points to a first end of the bar). If the user is not within the suitable distance range, then the bar is displayed with an indication of such (e.g., the bar is empty, or an arrow points to a second end of the bar). The display of the bar varies (e.g., the bar empties or fills, the arrow moves) based on how far away from the suitable distance range the user is. The further the user is away from the suitable distance range, the emptier the bar is or the closer the arrow points to the second end of the bar. As the user (and/or device 200) is moved so that the user gets closer to the suitable distance range, the bar is more filled or the arrow points closer to the first end of the bar. Similarly, as the user (and/or device 200) is moved so that the user gets further from the suitable distance range, the bar is less filled or the arrow points closer to the second end of the bar. The amount of fill in the bar or the location of the arrow can be changed by feedback module 216 using any of a variety of different public and/or proprietary techniques, or by the feedback module 216 selecting an appropriate one image (having an appropriate amount of fill in the bar or the arrow at the appropriate location) from a set of multiple images having different amounts of fill or arrow locations.

The use of such a bar or other icon can be used on its own, or alternatively in conjunction with one or more other feedback techniques discussed herein. For example, the bar or other icon can be displayed concurrently with changing the blur of an image (e.g., the bar or other icon is not blurred in such situations), transitioning from a from a black and white image to a color image, transitioning from a blank screen to an image on the display screen, and so forth.

In one or more implementations, the feedback provided by the feedback component 202 is a change in volume and/or pitch of a sound emitted by a speaker of the device 200 at a frequency that can be heard by humans. If the user is within the suitable distance range, then no sound is played back. If the user is not within the suitable distance range, then a sound is played back with a particular volume and/or pitch. The volume and pitch of the sound can vary based on how far away from the suitable distance range the user is. The further the user is away from the suitable distance range, the higher the volume and/or pitch of the sound. As the user (and/or device 200) is moved so that the user gets closer to the suitable distance range, the volume and/or pitch of the sound is increased. Similarly, as the user (and/or device 200) is moved so that the user gets further from the suitable distance range, the volume and/or pitch of the sound is decreased. Changes to the volume and/or pitch of the sound can be applied by feedback module 216 using any of a variety of different public and/or proprietary techniques, or by the feedback module 216 selecting an appropriate sound (having an appropriate volume and/or pitch) from a set of multiple sounds having different numbers of volumes and/or pitches.

In one or more implementations, the feedback provided by the feedback component 202 is a change in frequency of vibration of an actuator, motor, or other component of the device 200, providing haptic feedback to the user. If the user is within the suitable distance range, then no vibration is provided. If the user is not within the suitable distance range, then the actuator, motor, or other component vibrates at a particular frequency. The frequency can vary based on how far away from the suitable distance range the user is. The further the user is away from the suitable distance range, the higher the frequency of vibration. As the user (and/or device 200) is moved so that the user gets closer to the suitable distance range, the frequency of the vibration is increased. Similarly, as the user (and/or device 200) is moved so that the user gets further from the suitable distance range, the frequency of the vibration is decreased. The frequency of vibration can be changed by feedback module 216 using any of a variety of different public and/or proprietary techniques.

Various other types of feedback can also be provided. For example, feedback can be provided via holograms or haptic ultrasound (e.g., two-dimensional or three-dimensional haptic shapes in mid-air generated using focused ultrasound). By way of another example, olfactory feedback can be provided. By way of another example, feedback via bone conduction headsets can be provided. By way of another example, temperature based (e.g., hot to cold) feedback can be provided. By way of another example, feedback via accessibility devices that cross senses can be provided (e.g., accessibility devices that use nerves on a user's tongue to send light signals to the user's brain).

Various different examples of feedback provided by the feedback component 202 are discussed herein. It should be noted that these are examples, and that other types of feedback can alternatively be provided by the feedback component 202. Furthermore, in one or more implementations multiple types of feedback are provided concurrently. For example, the feedback provided by the feedback component 202 can be both a blurring of an image on a display screen of the device 200 and a change in frequency of vibration of an actuator or other component of the device 200.

It should further be noted that the feedback provided by the feedback component 202 can also provide an indication whether the user is too far away from the camera or too close to the camera. Feedback differentiating between too far away from the camera and too close to the camera can be provided in different manners, depending on what type of feedback is used. For example, the color of a light source can change depending on whether the user is too close or too far from the camera (e.g., too close and the light source is red, too far and the light source is green). By way of another example, different sounds can be used depending on whether the user is too close or too far from the camera (e.g., too close and one sound is played back, too far and another sound is played back). By way of yet another example, different vibration patterns can be used for haptic feedback depending on whether the user is too close or too far from the camera (e.g., too close and one vibration pattern is used, too far and another vibration pattern is used).

In one or more implementations, the techniques discussed herein are used to authenticate a single user at a time for access to a desired device, resource, location, service, and so forth. For example, one user at a time can be logged into a mobile device, and the techniques discussed herein are used to authenticate a single user for login to the mobile device.

Alternatively, the techniques discussed herein are used to authenticate multiple users concurrently for access to a desired device, resource, location, service, and so forth. Thus, one user can be authenticated while another user is using the computing device 200. For example, assume a situation in which the computing device 200 is coupled to a large display, such as a large display screen in a conference room. A first user can be authenticated as discussed above, and being using the computing device 200. When a second user approaches the computing device 200, feedback can be provided to the second user to indicate to the second user whether he or she is within the suitable distance range of the camera so that the second user can be authenticated as well. This feedback is provided concurrently with the first user continuing to use the computing device 200, and done in a manner to reduce or eliminate interference with the first user's use of the computing device 200. For example, the feedback can be changing the luminous intensity or blurring of a portion of the display screen, such as a corner or edge of the display screen, that is closest to the side of the display screen that the second user approaches. Thus, only the portion of the display screen closest to the second user is affected by the change in luminous intensity or blurring, and any interruption to the first user is reduced.

Additionally, some of the discussions herein refer to providing feedback indicating to the user whether he or she is within the suitable distance range of the camera. Feedback indicating whether the user is within the field of view of the camera for the user features being used for authentication can be provided in an analogous manner. For example, the luminous intensity of different light sources (e.g., different LEDs or different portions of a display screen) can be changed to indicate that the user is not within the field of view than are used to indicate that the user is within the field of view. The presence of the user, even though not in the field of view for the features being used for authentication, can be detected in various manners. For example, the field of view for the features being used for authentication may be smaller than the field of view of the camera (e.g., the camera may have a field of view of 60 degrees, but use a field of view of 30 degrees for the features being used for authentication), and thus the feedback module 216 can detect the presence of the user outside of the field of view of the camera for the features being used for authentication.

Figure 4:
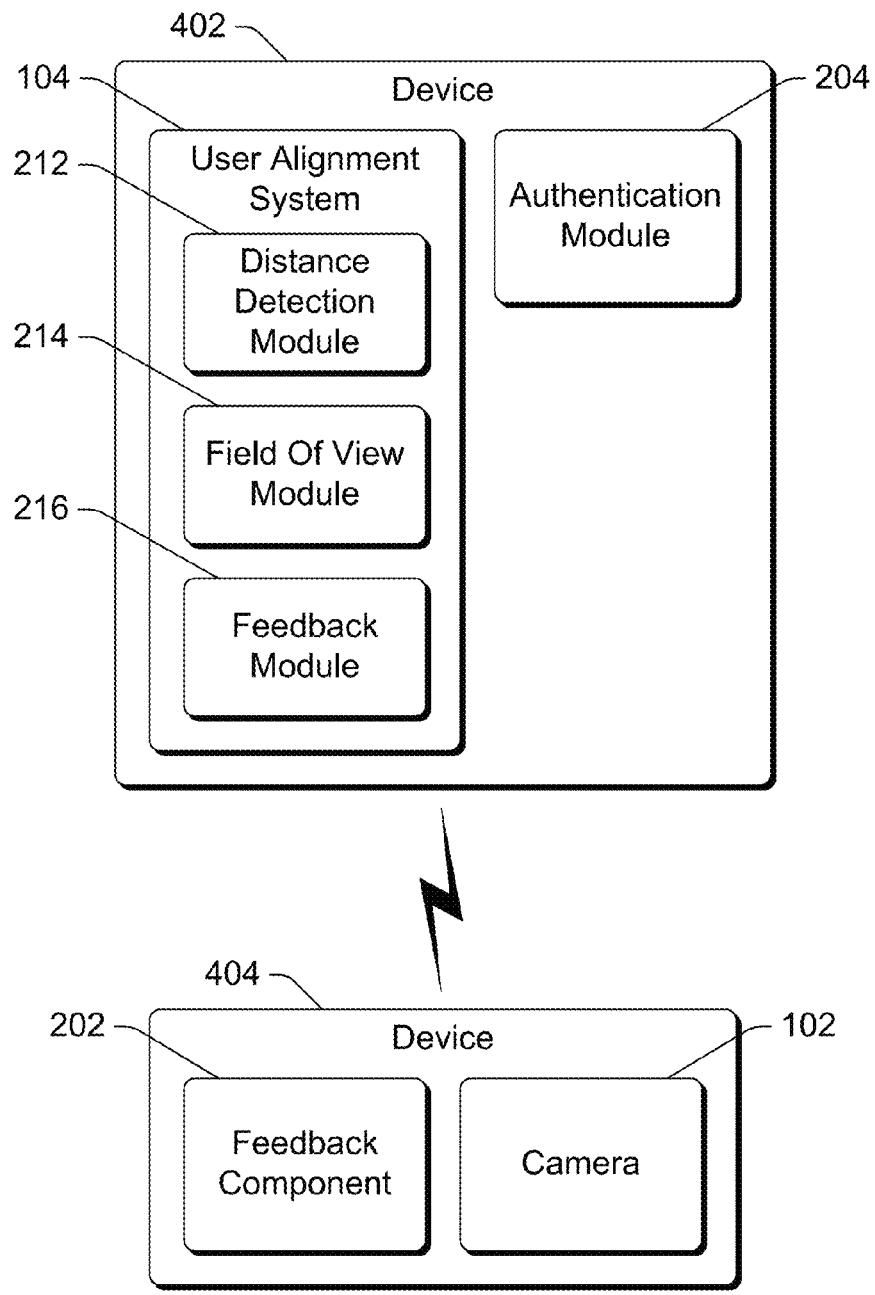
FIG. 4 illustrates an example system implementing the facilitating aligning a user and camera for user authentication in accordance with one or more implementations.

FIG. 4 illustrates an example system 400 implementing the facilitating aligning a user and camera for user authentication in accordance with one or more implementations. The system 400 includes a device 402 and a device 404. The system 400 is similar to the device 200 of FIG. 2, but differs in that the modules and components are distributed across multiple devices in the system 400. The user alignment system 104 and the authentication module 204 are included in one device (e.g., a mobile device, such as a smartphone), and the feedback component 202 and the camera 102 are implemented in a different device (e.g., a watch or bracelet).

Figure 5:
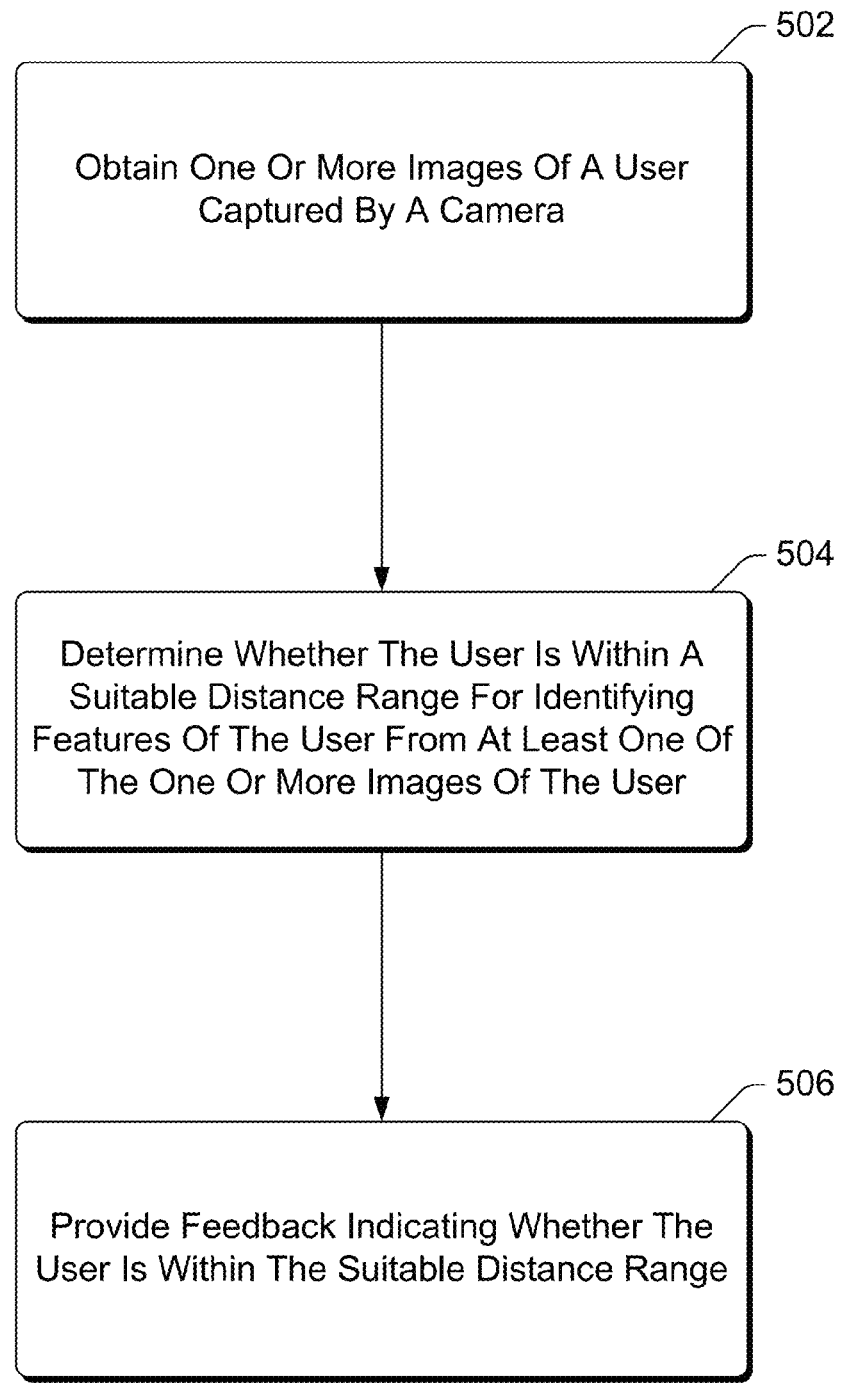
FIG. 5 is a flowchart illustrating an example process for facilitating aligning a user and camera for user authentication in accordance with one or more implementations.

FIG. 5 is a flowchart illustrating an example process 500 for facilitating aligning a user and camera for user authentication in accordance with one or more implementations. Process 500 is carried out by one or more devices, such as device 200 of FIG. 2, or devices 402 and 404 of FIG. 4, and can be implemented in software, firmware, hardware, or combinations thereof. Process 500 is shown as a set of acts and is not limited to the order shown for performing the operations of the various acts. Process 500 is an example process for facilitating aligning a user and camera for user authentication; additional discussions of facilitating aligning a user and camera for user authentication are included herein with reference to different figures.

The process 500 is initiated or begins in response to an indication that a user is to be authenticated. This indication can take a variety of different forms, such as a user picking up a device (e.g., as sensed by an accelerometer or other component of the device), a user pressing a power-on or other button of a device, a user input of a gesture (e.g., swiping a finger across a touchscreen device), a user moving a peripheral device (e.g., a mouse coupled to the device), and so forth.

In process 500, one or more images of a user are captured by a camera (act 502). The camera can be any of a variety of different image capture devices as discussed above. If not already activated or powered-on, the camera is also activated or powered-on in act 502.

A determination is made as to whether the user is within a suitable distance range for identifying features of the user from at least one of the one or more images of the user (act 504). The one or more images are the images captured in act 502. The suitable distance range can vary based on the features being used for authentication, as discussed above.

Feedback is provided indicating whether the user is within the suitable distance range (act 506). The feedback can be various different types of feedback as discussed above, such as one or a combination of audio feedback, visual feedback, and haptic feedback. The feedback allows the user to know that he or she is not within the suitable distance range, and so he or she can move (or move the device that includes the camera) so that he or she is situated within the suitable distance range and can be authenticated. Once the user is within the suitable distance range, the feedback can optionally be stopped (e.g., a vibration that is haptic feedback can be stopped, a sound that is audio feedback can be stopped, and so forth).

The techniques discussed herein support a variety of different usage scenarios. For example, the techniques discussed herein can be used in authenticating a user to unlock his or her mobile device, with feedback being provided to the user indicating whether he or she is within a suitable distance range of the camera of the mobile device for authentication. By way of another example, the techniques discussed herein can be used in authenticating a user to unlock his or her mobile device via a watch on his or her wrist that includes a camera, with feedback being provided to the user via the watch whether the user is within a suitable distance range of the camera for authentication. By way of another example, the techniques discussed herein can be used in authenticating a user to unlock his or her desktop computer, with feedback being provided to the user indicating whether he or she is within a suitable distance range of the camera of the desktop computer for authentication. By way of yet another example, the techniques discussed herein can be used in authenticating multiple users for a computing device serially or simultaneously, with feedback being provided to the one user indicating whether he or she is within a suitable distance range of the camera of the computing device for authentication without disrupting another user using the same computing device and display screen.

Furthermore, it should be noted that the techniques discussed herein provide foveal and/or non-foveal feedback to the user indicating whether he or she is within a suitable distance range of the camera of the mobile device for authentication without having to display an image of the user's face or eye. For example, if the user is looking at his or her mobile device while being authenticated, his or her face, eye, or other features are analyzed as discussed above, but the display screen of the mobile device need not display an image of the user's face, eye, or other features. Thus, the user does not have to be staring at himself or herself in the device screen.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
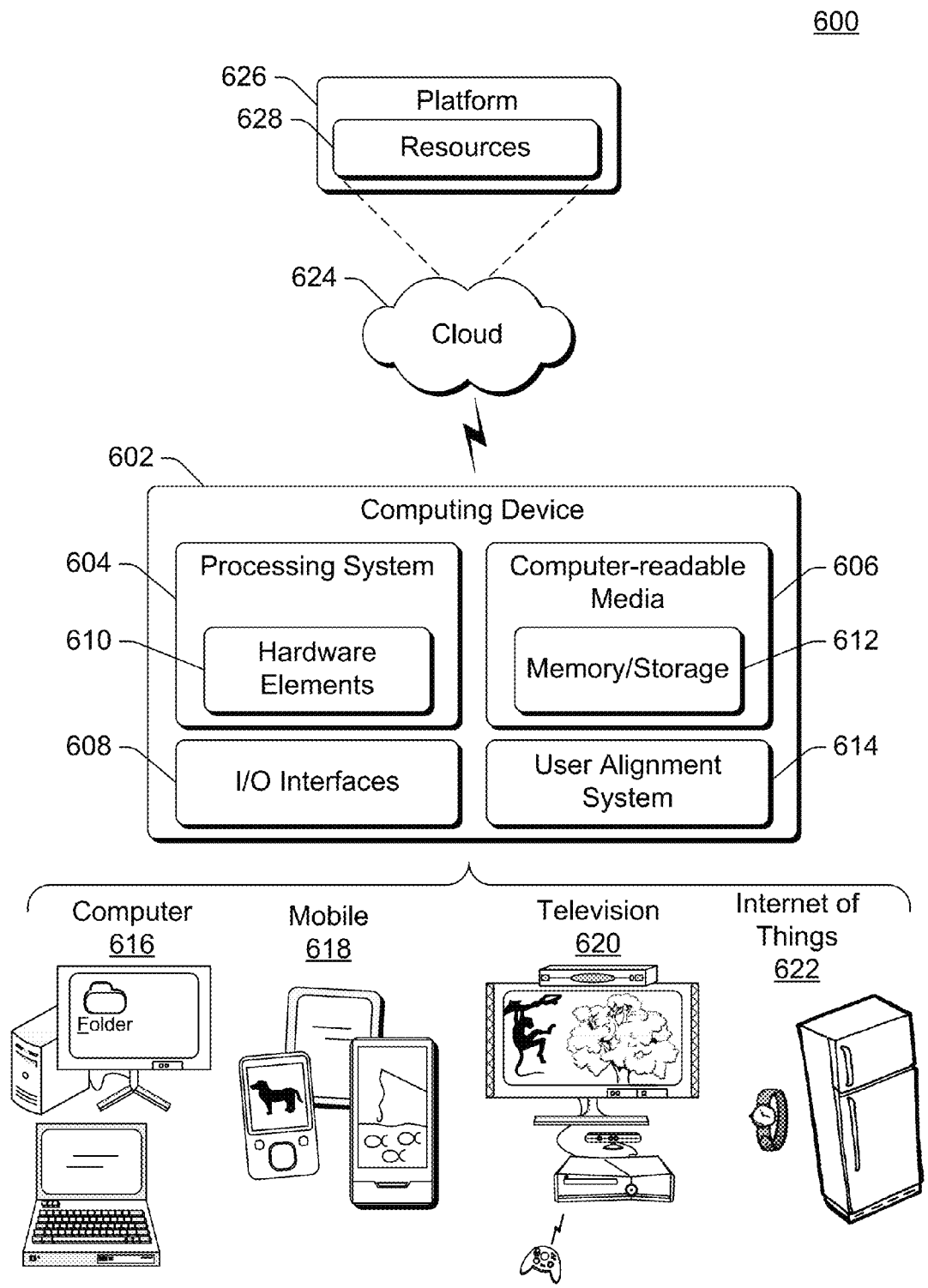
FIG. 6 illustrates an example system generally that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a user alignment system 614. The user alignment system 614 provides various functionality facilitating aligning a user and camera for user authentication, as discussed above. The user alignment system 614 can be, for example, the user alignment system 104 of FIG. 1, 2, or 4.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more implementations, the central computing device may be a cloud of one or more server computers that are connected to the multiple devices through a network, the Internet, or other data communication link.

In one or more implementations, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more implementations, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, television 620, and IoT 622 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, a watch or bracelet, devices without screens, and so on. The computing device 602 may also be implemented as the television 620 class of device that includes devices having or connected to generally larger screens in casual viewing environments. These devices include televisions, set-top boxes, gaming consoles, and so on. The computing device 602 may also be implemented as the IoT 622 class of device, such as a household appliance, a heating and cooling control device, a security system device, and so on.

The techniques described herein may be supported by these various configurations of the computing device 602 and are not limited to the specific examples of the techniques described herein. This functionality may also be implemented all or in part through use of a distributed system, such as over a "cloud" 624 via a platform 626 as described below.

The cloud 624 includes and/or is representative of a platform 626 for resources 628. The platform 626 abstracts underlying functionality of hardware (e.g., servers) and software resources of the cloud 624. The resources 628 may include applications and/or data that can be utilized while computer processing is executed on servers that are remote from the computing device 602. Resources 628 can also include services provided over the Internet and/or through a subscriber network, such as a cellular or Wi-Fi network.

The platform 626 may abstract resources and functions to connect the computing device 602 with other computing devices. The platform 626 may also serve to abstract scaling of resources to provide a corresponding level of scale to encountered demand for the resources 628 that are implemented via the platform 626. Accordingly, in an interconnected device implementations, implementation of functionality described herein may be distributed throughout the system 600. For example, the functionality may be implemented in part on the computing device 602 as well as via the platform 626 that abstracts the functionality of the cloud 624.

In the discussions herein, various different implementations are described. It is to be appreciated and understood that each implementation described herein can be used on its own or in connection with one or more other implementations described herein. Any of the devices, methods, and so forth discussed herein can be used in conjunction with any other devices, methods, and so forth discussed herein. Further aspects of the techniques discussed herein relate to one or more of the following implementations.

A method comprising: obtaining an image of a user captured by a camera; determining whether the user is within an interaction zone, the interaction zone comprising an area bounded by both a field of view of the camera and a distance range suitable for identifying features of the user from an additional image of the user captured by the camera; and providing feedback indicating whether the user is within the interaction zone, the feedback being effective to reduce energy usage by the camera by allowing the camera to be deactivated more quickly due to the user being situated within the distance range more quickly, the feedback comprising one or a combination of audio feedback, visual feedback, and haptic feedback.

Alternatively or in addition to any of the above described methods, any one or combination of: the providing feedback further comprising providing feedback indicating whether the user is too far from the camera or too close to the camera; the method implemented by a device that includes the camera; the features of the user including features of the face of the user as well as features of the eye or iris of the user; the method implemented by a device, and the providing feedback further comprising providing the feedback while allowing an additional user to use the device; the feedback comprising visual feedback that is blurring of a display image, the display image being non-blurred in response to the user being within the distance range suitable for identifying features of the user, and the display image being blurred in response to the user not being within the distance range, an amount blur in the display image being greater the further the user is away from the distance range; the feedback comprising audio feedback that is a sound, one or both of a volume and a pitch of the sound changing as the user moves closer to the distance range suitable for identifying features of the user; the method implemented by a device that includes a haptic feedback component, the feedback comprising haptic feedback and a frequency of vibration of the haptic feedback component changing as the user or device are moved so that the user is closer to the distance range suitable for identifying features of the user.

A device comprising: one or more processors; and a computer-readable storage medium having stored thereon multiple instructions that, responsive to execution by the one or more processors, cause the one or more processors to perform acts comprising: obtaining one or more images of a user captured by a camera; determining whether the user is within a suitable distance range for identifying features of the user from at least one of the one or more images of the user; and providing feedback indicating whether the user is within the suitable distance range, the feedback being effective to reduce energy usage by the camera by allowing the camera to be deactivated more quickly due to the user being situated within the distance range more quickly, the feedback comprising one or a combination of different types of feedback that can be sensed by the user.

Alternatively or in addition to any of the above described devices, any one or combination of: the providing feedback further comprising providing feedback indicating whether the user is too far from the camera or too close to the camera; the device including the camera; the providing feedback further comprising providing the feedback while allowing an additional user to use the device; the feedback comprising visual feedback that is blurring of a display image, the display image being non-blurred in response to the user being within the suitable distance range, and the display image being blurred in response to the user not being within the suitable distance range, an amount of blur in the display image being greater the further the user is away from the suitable distance range; the device further comprising a display screen, and the display image being displayed on the display screen.

A device comprising a camera and one or more feedback components, the camera being configured to capture one or more images of a user, the one or more feedback components being configured to receive an indication of whether the user is within a suitable distance range for identifying features of the user from at least one of the one or more images of the user and to provide feedback indicating whether the user is within the suitable distance range, the feedback being effective to reduce energy usage by the camera by allowing the camera to be deactivated more quickly due to the user being situated within the distance range more quickly, the one or more feedback components being also configured to provide one or a combination of audio feedback, visual feedback, and haptic feedback.

Alternatively or in addition to any of the above described devices, any one or combination of: the one or more feedback components being configured to receive, from an additional device, the indication of whether the user is within a suitable distance range; the providing feedback further comprising providing feedback indicating whether the user is too far from the camera or too close to the camera; the one or more feedback components being further configured to provide the feedback while allowing an additional user to use the device; the feedback comprising visual feedback that is blurring of a display image, the display image being non-blurred in response to the user being within the suitable distance range, and the display image being blurred in response to the user not being within the suitable distance range, an amount of blur in the display image being greater the further the user is away from the suitable distance range; the device further comprising a haptic feedback component, the feedback comprising haptic feedback and a frequency of vibration of the haptic feedback component changing as the user or device are moved so that the user is closer to the suitable distance range.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining an image of a user captured by a camera;
   determining whether the user is within an interaction zone, the interaction zone comprising an area bounded by both a field of view of the camera and a distance range suitable for identifying features of the user from an additional image of the user captured by the camera, the distance range comprising a set of distances between an upper threshold distance away from the camera and a lower threshold distance away from the camera, the set of distances for the camera for a type of recognition being used for identifying the features of the user being accessible to a module performing the determining; and
   providing feedback indicating whether the user is within the interaction zone, the feedback comprising one or a combination of audio feedback, visual feedback, and haptic feedback.

2. The method of claim 1, the providing feedback further comprising providing, responsive to determining that the user is less than the lower threshold distance away from the camera, feedback indicating that the user is too close to the camera or providing, responsive to determining that the user is more than the upper threshold distance away from the camera, feedback indicating that the user is too far from the camera.

3. The method of claim 1, the method implemented by a device that includes the camera.

4. The method of claim 1, the features of the user including features of the face of the user as well as features of the eye or iris of the user.

5. The method of claim 1, the method implemented by a device, and the providing feedback further comprising providing the feedback while allowing an additional user to use the device.

6. The method of claim 1, the feedback comprising visual feedback that is blurring of a display image, the display image being non-blurred in response to the user being within the distance range suitable for identifying features of the user, and the display image being blurred in response to the user not being within the distance range, an amount blur in the display image being greater the further the user is away from the distance range.

7. The method of claim 1, the feedback comprising audio feedback that is a sound emitted by a speaker, one or both of a volume and a pitch of the sound emitted by the speaker changing as the user moves closer to the upper threshold distance of the distance range suitable for identifying features of the user.

8. The method of claim 1, the method implemented by a device that includes a haptic feedback component, the feedback comprising haptic feedback and a frequency of vibration of the haptic feedback component changing as the user or device are moved so that the user is closer to the distance range suitable for identifying features of the user.

9. A device comprising:
   one or more processors; and
   a computer-readable storage medium having stored thereon multiple instructions that, responsive to execution by the one or more processors, cause the one or more processors to perform acts comprising:
      obtaining one or more images of a user captured by a camera;
      determining whether the user is within a suitable distance range for identifying features of the user from at least one of the one or more images of the user, the suitable distance range comprising a set of distances between an upper threshold distance away from the camera and a lower threshold distance away from the camera, the set of distances for the camera for a type of recognition being used for identifying the features of the user being accessible to a module performing the determining; and
      providing feedback indicating whether the user is within the suitable distance range, the feedback comprising one or a combination of different types of feedback that can be sensed by the user.

10. The device of claim 9, the providing feedback further comprising providing, responsive to determining that the user is less than the lower threshold distance away from the camera, feedback indicating that the user is too close to the camera or providing, responsive to determining that the user is more than the upper threshold distance away from the camera, feedback indicating that the user is too far from the camera.

11. The device of claim 9, the device including the camera.

12. The device of claim 9, the providing feedback further comprising providing the feedback while allowing an additional user to use the device.

13. The device of claim 9, the feedback comprising visual feedback that is blurring of a display image, the display image being non-blurred in response to the user being within the suitable distance range, and the display image being blurred in response to the user not being within the suitable distance range, an amount of blur in the display image being greater the further the user is away from the suitable distance range.

14. The device of claim 13, the device further comprising a display screen, and the display image being displayed on the display screen.

15. A device comprising a camera, a user alignment system, and one or more feedback components, the camera being configured to capture one or more images of a user, the one or more feedback components being configured to receive an indication of whether the user is within a suitable distance range for identifying features of the user from at least one of the one or more images of the user, the suitable distance range comprising a set of distances between an upper threshold distance away from the camera and a lower threshold distance away from the camera, the set of distances for the camera for a type of recognition being used for identifying the features of the user being accessible to a module determining whether the user is within the suitable distance range and to provide feedback indicating whether the user is within the suitable distance range, the one or more feedback components being also configured to provide one or a combination of audio feedback, visual feedback, and haptic feedback.

16. The device of claim 15, the one or more feedback components being configured to receive, from an additional device, the indication of whether the user is within a suitable distance range.

17. The device of claim 15, the providing feedback further comprising providing, responsive to determining that the user is less than the lower threshold distance away from the camera, feedback indicating that the user is too close to the camera or providing, responsive to determining that the user is more than the upper threshold distance away from the camera, feedback indicating that the user is too far from the camera.

18. The device of claim 15, the one or more feedback components being further configured to provide the feedback while allowing an additional user to use the device.

19. The device of claim 15, the feedback comprising visual feedback that is blurring of a display image, the display image being non-blurred in response to the user being within the suitable distance range, and the display image being blurred in response to the user not being within the suitable distance range, an amount of blur in the display image being greater the further the user is away from the suitable distance range.

20. The device of claim 15, the device further comprising a haptic feedback component, the feedback comprising haptic feedback and a frequency of vibration of the haptic feedback component changing as the user or device are moved so that the user is closer to the suitable distance range.

* * * * *